Rolf E. James
Edward N. McDonald INVENTORS

Oct. 18, 1960 R. E. JAMES ET AL 2,956,836
DOOR CONSTRUCTION FOR VEHICLES AND THE LIKE
Filed Sept. 9, 1958 3 Sheets-Sheet 2
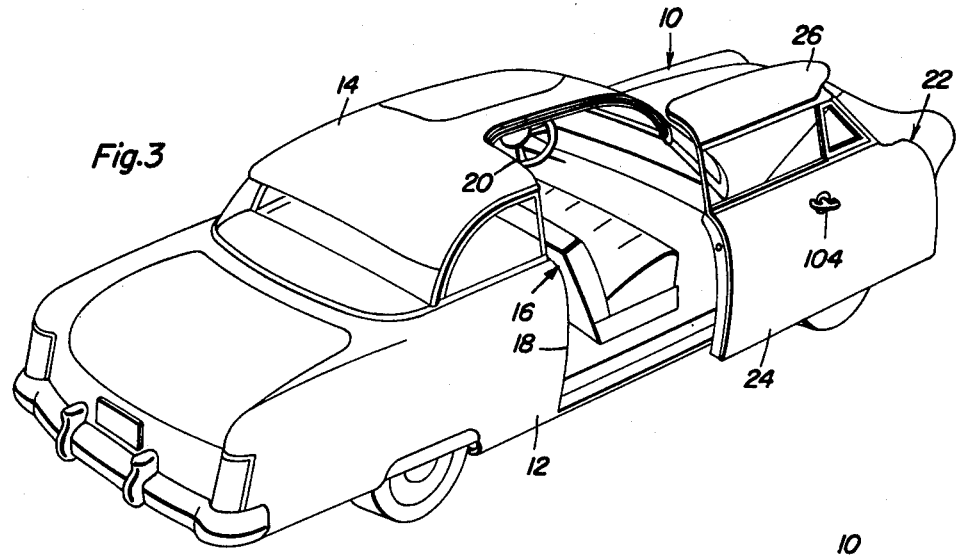
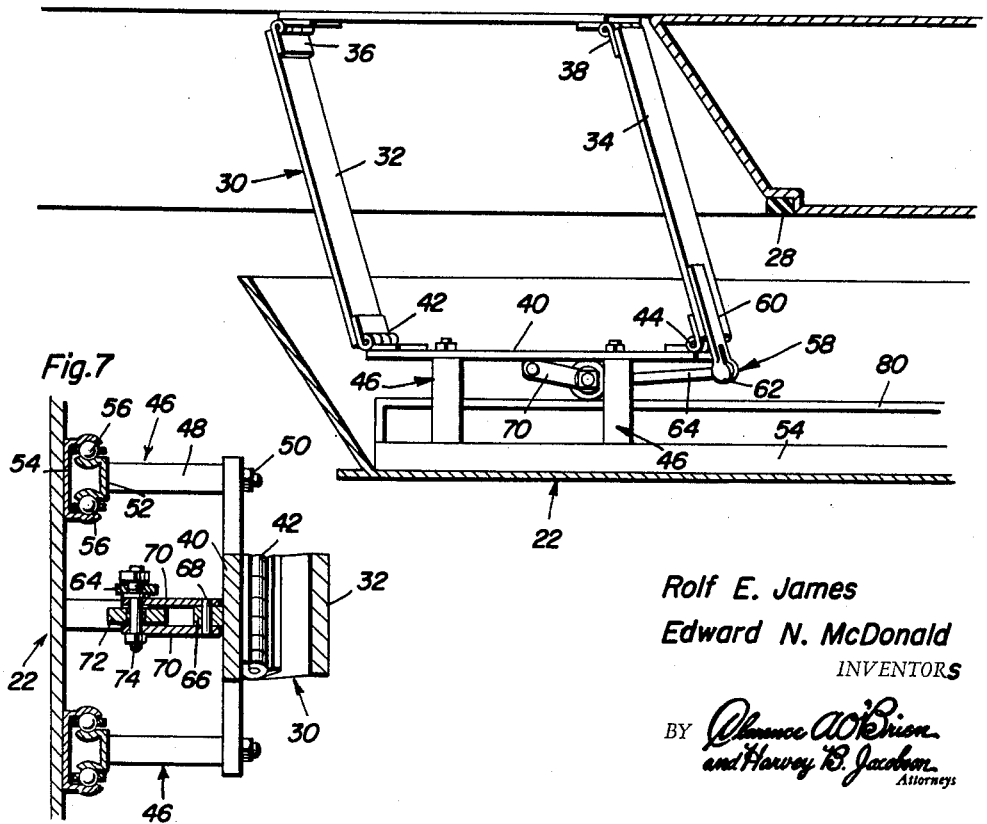
Rolf E. James
Edward N. McDonald
INVENTORS
BY *Clarence A. O'Brien*
*and Harvey B. Jacobson*
Attorneys

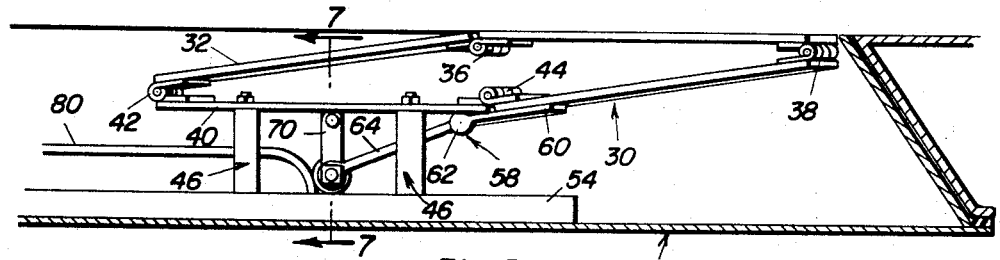
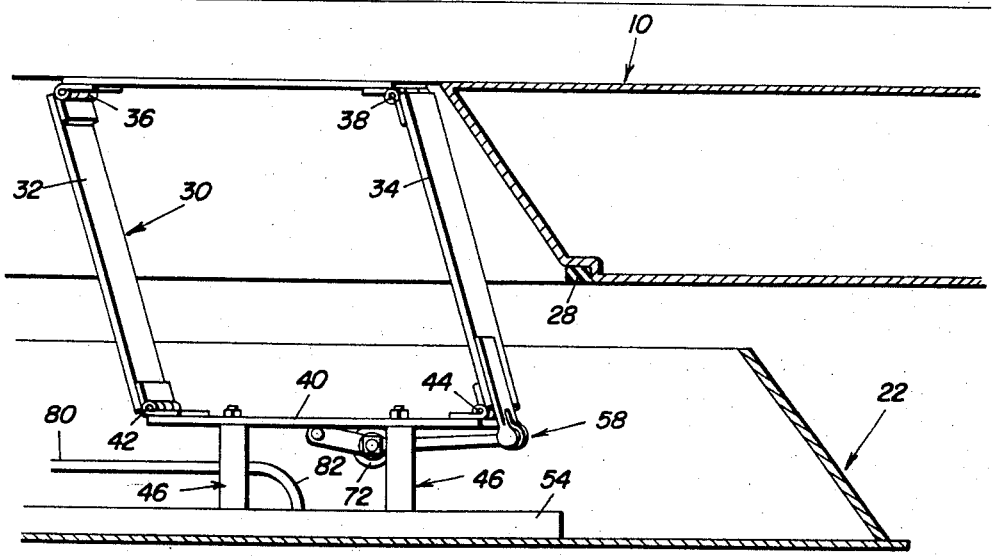
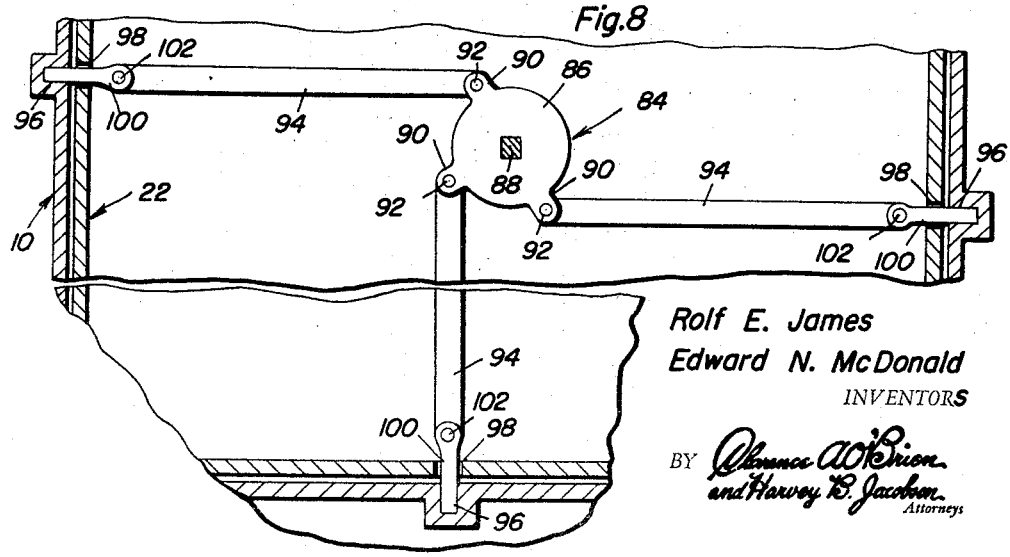

United States Patent Office 2,956,836
Patented Oct. 18, 1960

2,956,836
DOOR CONSTRUCTION FOR VEHICLES AND THE LIKE

Rolf E. James, 558 Claremont Ave., Westmount, Quebec, Canada, and Edward N. McDonald, 110 Regent Ave., Beaconsfield, Quebec, Canada Filed Sept. 9, 1958, Ser. No. 760,004

4 Claims. (Cl. 296—46)

This invention relates in general to new and useful improvements in door constructions, and more specifically to a door construction primarily intended for use with vehicles.

At the present time there exists many conditions where it is desirable that a flush mounted door be swung to an open position and yet extend only a slight distance away from the wall of which it is a part. It is therefore the primary object of this invention to provide a door construction wherein a door thereof is so mounted whereby it is initially swung out of the plane of the wall and generally parallel thereto, and then is slid parallel to the wall to its final open position.

Following the recent trend of automotive design, automotive bodies are being built lower with the result that it is becoming more difficult each year to gain access to the interior of the automobile through the doors thereof. It is therefore another object of this invention to provide a door construction particularly adapted for vehicles, such as automobiles, wherein the door includes a side wall portion and a top portion so that the doorway into the vehicle may open not only through the side wall thereof, but also through the top thereof.

Another object of this invention is to provide an improved vehicle door, the vehicle door including a generally vertical side wall portion and a top defining portion, the vehicle having a complementary doorway formed therein, and there being provided suitable mounting means for the door whereby the door is first swung upwardly, outwardly and forwardly to a position slightly above, outwardly and forwardly from its original position, but generally parallel thereto, and then is firmly slid parallel to its original position until it clears the doorway.

Another object of this invention is to provide an improved door construction, which door construction includes at least a pair of vertically spaced hinge units, the hinge units being of such a nature whereby as the door is moved to an open position, it is swung parallel and outwardly away from its original position, the hinges being provided with suitable guides which are engaged by tracks on the door so that after the door has been swung outwardly parallel to its original position, it may be slid in a plane parallel to its original plane to a fully open position.

Another object of this invention is to provide an improved support for a door, a support for the door including hinge units of the type which permits the door to be swung outwardly from its original position while remaining parallel thereto at all times, and there being provided suitable track means between the door and the hinge units whereby the door may be slid longitudinally, from its partially open position to its fully open position, and there being provided cooperating lock means between the hinge units and the door whereby the hinge units are automatically locked in their open position when the door is slid longitudinally relative thereto.

A further object of this invention is to provide an improved door construction which includes a wall having a flush mounted door, the door being so mounted whereby it may be swung out of the plane of the wall and then moved parallel to the wall and closely adjacent the wall to an open position.

A further object of this invention is to provide improved safety and security for a door closure, a door closure which cannot be forced open by impact or by unauthorized persons since the door is not hinged at one end and locked at the other end, but since it falls flush into the wall and normal thereto, being locked and secured by bars projecting into the wall on at least three sides, which bars form an integral part with the wall at these three sides and a permanent attachment between the door and the wall, such attachment and closure being capable of being opened only by a deliberate action, and only on the part of authorized persons.

It is another object of this invention to provide an improved articulation for a door which is suitable for power operation, an articulation which, providing a connection by means of laterally paired hinges at or near the center of the door instead of vertically spaced hinges at one side of the door, as well as a longitudinal sliding motion of the door, permits complete and close control over every movement of the door, so that such door can be power operated by simple electric motors, gears or hydraulics.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 3 is a perspective view in a reduced scale and shows the door in its fully open position;

Figure 4 is a fragmentary horizontal sectional view taken through the door and the vehicle body in the vicinity of the door with the door in its fully closed position;

Figure 5 is an enlarged fragmentary horizontal sectional view similar to Figure 4 and shows the door in its partially open position;

Figure 6 is an enlarged fragmentary horizontal sectional view similar to Figures 4 and 5 and shows the door in its fully open position;

Figure 8 is an enlarged fragmentary vertical longitudinal sectional view taken through the door and shows the specific details of latch means for locking it in a closed position; and Figure 7 is an enlarged fragmentary transverse sectional view taken through the door substantially on the section line 7—7 of Figure 4 and shows the specific details of the mounting of the door on a supporting frame therefor.

Figure 1:
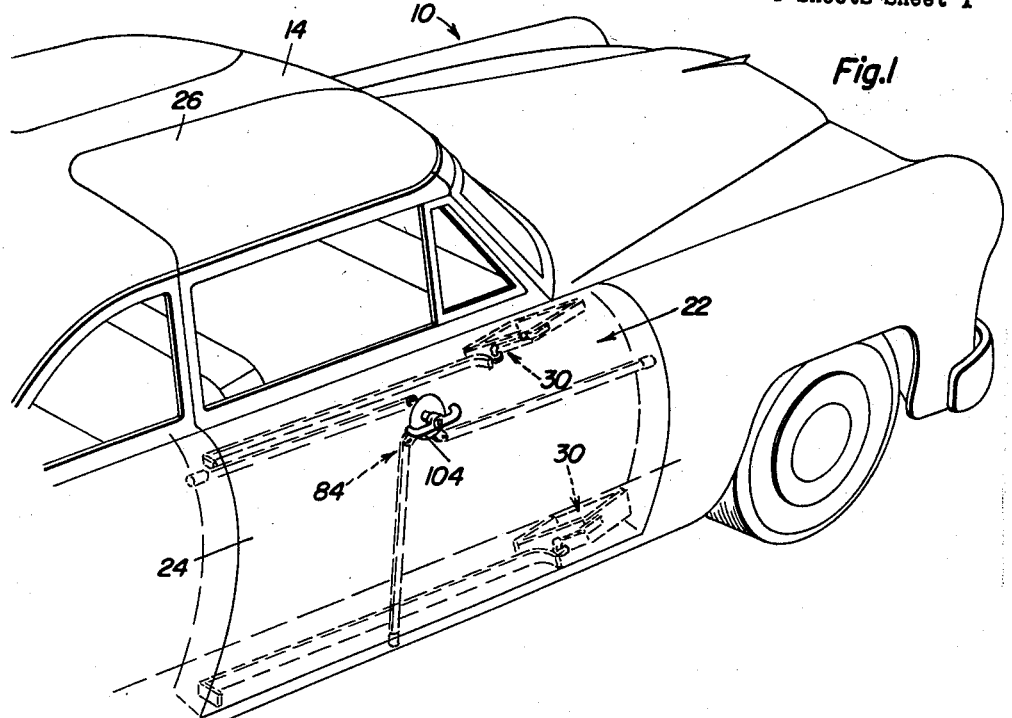
Figure 1 is a fragmentary perspective view of an automobile incorporating the door which is the subject of this invention, the door being shown in a fully closed position.
Figure 2:
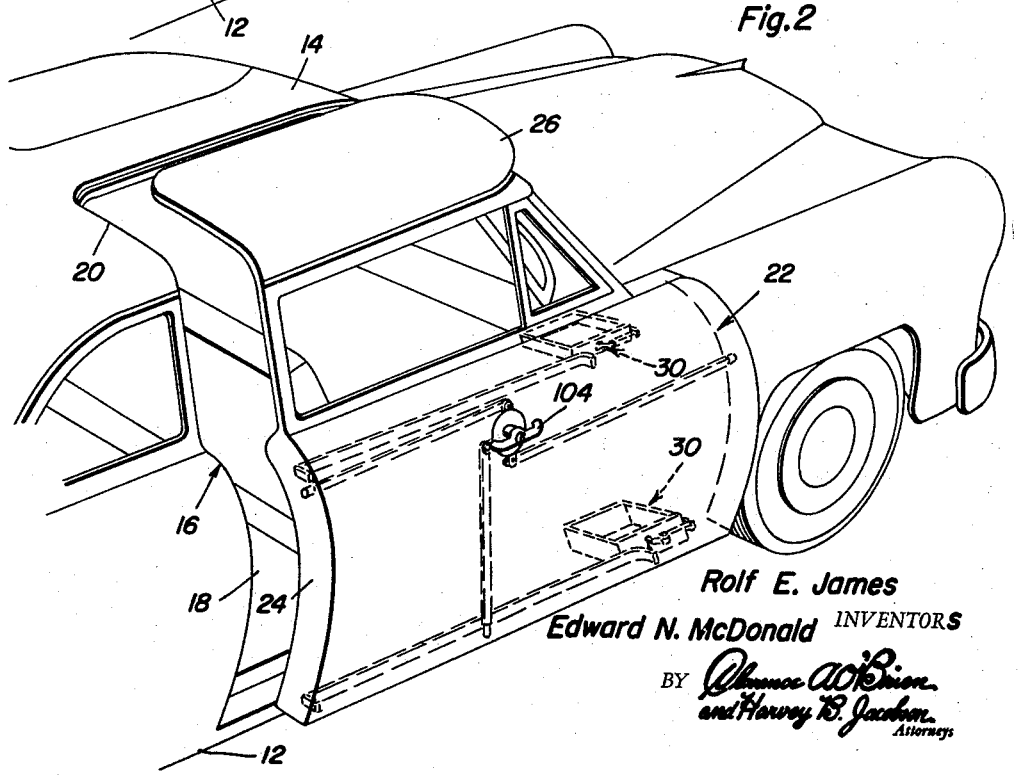
Figure 2 is a perspective view similar to Figure 1 and shows the door in a partially open position, the door having been moved upwardly, outwardly and forwardly from its original position.

Referring now to the drawings in detail, it will be seen that there is illustrated a preferred use of the door construction which is the subject of this invention. Illustrated in Figures 1, 2 and 3 is a vehicle which is referred to in general by the reference numeral 10. Among other body components, the vehicle 10 includes a side wall 12 and a top 14. The vehicle 10 differs from the customary vehicle only in that it has a doorway 16 on each side thereof, which doorway 16 includes a generally vertical portion 18 which extends substantially the full height of the side wall 12, and a top portion 20, the doorway 16 extending into the top 14.

In order that the doorway 16 may be closed, there is provided a door which is referred to in general by the reference numeral 22. The door 22 is a part of the door construction, which is the subject of this invention, and includes a generally vertical side wall forming portion 24 and a top defining portion 26. The door 22 is complementary to the outline of the doorway 16 and when in its fully closed position, is set flush with the body of the vehicle 10, completely closing the doorway 16, as is best shown in Figure 1. When in this position, the door 22 is completely sealed with respect to the body of the vehicle 10 by means of suitable sealing strips, such as the sealing strip 28 illustrated in Figures 4, 5 and 6.

Unlike conventional doors, the door 22, when moved from its fully closed position of Figure 1 is first moved outwardly, forwardly and upwardly while remaining generally parallel to its original position. After the door 22 has moved outwardly sufficiently to clear the vehicle body, it is then slid longitudinally of the vehicle to its completely open position illustrated in Figure 3. In order to accomplish the opening and closing of the door 22 in the manner described above, there are provided at least two hinge units which are vertically spaced. Each of the hinge units referred to in general by the reference numeral 30 and includes a pair of longitudinally spaced parallel arms 32 and 34 which are connected to the vehicle 10 by means of hinges 36 and 38, respectively. The arms 32 and 34 are connected together remote from the hinges 36 and 38 by means of a strap 40. The strap 40 is connected to the arm 32 by means of a hinge 42 and to the arm 34 by means of a hinge 44. It is to be noted that the hinges 36, 38, 42 and 44 are all generally vertically disposed, but are at a slight angle to the vertical. By so positioning the hinges 36, 38, 42 and 44, when the strap 40 is swung outwardly from its position illustrated in Figure 4 to a position illustrated in Figure 5, the strap 40 not only moves outwardly, but also slightly upwardly and forwardly. The purpose of this upper move will become obvious hereinafter.

Secured to each strap 40 is a pair of longitudinally spaced guides which are referred to in general by the reference numeral 46. Each of the guides 46 includes an outwardly extending spacer 48 which is secured to its respective strap 40 by means of a nut bolt connection 50. Secured to the outer end of each of the spacers 48 is a guide member 52.

The door 22 is provided with a plurality of longitudinally extending tracks 54. There is one track 54 for each of the guides 52 and such track is generally complementary to the guide 52, as is best shown in Figure 7. Disposed between each of the guides 52 and associated track 54 are bearing units 56. Thus the tracks 54 may be freely slid relative to the guides 52, this construction permits the door 22 to be moved longitudinally while being maintained parallel to its original position. The tracks 54 will, of course, have suitable stops (not shown) at opposite ends thereof to limit the longitudinal sliding movement of the door 22 so that it remains mounted on the hinge units 30 at all times.

As will be appreciated, it is necessary that the hinge units 30 be locked in their open positions during the longitudinal sliding of the door 22. In order to accomplish this, there are provided suitable latch means 58 for each of the hinge units 30.

The latch means 58 includes an extension arm 60 on the arm 34. Hingedly connected to the extension arm 60 by means of a ball type hinge 62 is a link 64. The link 64 extends generally along the strap 40.

Secured to the central part of the strap 40 and projecting outwardly therefrom is a mounting lug 66. The mounting lug 66 has hingedly connected thereto by means of a hinge pin 68 a pair of links 70 which function as a second link. The links 70 have mounted between the opposite ends thereof a roller 72, the roller 72 being mounted on a pin 74. The pin 74 is also the hinge for the link 64.

As is best shown in Figure 4, when the hinge unit 30 is in its door closing position, the links 64 and 70 are in a buckled position with the rollers 72 projecting away from the strap 40. On the other hand, when the hinge unit 30 is moved to its door opening position, as is shown in Figure 5, the links 64 and 70 move toward alignment with each other and the roller 72 moves towards the strap 40. It will be readily apparent that if outward movement of the roller 72 is prevented, then the hinge unit 30 cannot collapse to its position of Figure 4. In order to accomplish this, there is mounted on the door 22 for each of the latch means 58 a cam track 80. The cam track 80 has a forward cam portion 82 over which the roller 72 rides to assure the locking of the hinge unit 30 in its door open position. The cam track 80 then continues to ride against the roller 72 as the door 22 is slid longitudinally of its initially open position of Figure 5 so as to prevent the hinge unit 30 from collapsing. On the other hand, when the door 22 is swung back to the position illustrated in Figure 5, then the latch means 58 is no longer effective and the hinge units 30 may be collapsed to their positions of Figure 4.

From the foregoing description of the means mounting the door 22 on the vehicle 10, it will be readily apparent that when it is desired to open the door 22, it is merely necessary to pull outwardly on the door 22 at which time it will swing outwardly, forwardly and upwardly from its position of Figure 1 to its position of Figure 2. Then by exerting a longitudinal pressure on the door 22, it will slide from its position of Figure 2 to its position of Figure 3. When this has been accomplished, the complete doorway 16 is cleared and the vehicle 10 may be readily entered without the necessity of the person entering the vehicle ducking or stooping as is now required.

It is to be understood that the sealing strips 28 will extend entirely about the doorway 16 so that once the door 22 has been moved to its fully closed position of Figure 1, a complete seal between the door 22 and the body of the vehicle 10 is accomplished. Thus, even though the door 22 does extend through part of the top 14 of the vehicle 10, leakage about the doorway 16 is eliminated.

Referring now to Figure 8 in particular, it will be seen that there is illustrated a lock mechanism which is referred to in general by the reference numeral 84. The lock mechanism 84 includes a single pitman wheel 86 mounted on a shaft 88. The pitman wheel 86 has projecting from the periphery thereof a plurality of ears 90. Pivotally connected to each of the ears 90 by means of a pivot pin 92 is a latch arm 94.

The body of the vehicle 10 has formed therein suitable latch forming area receiving sockets 96. Aligned with each of the latch receiving sockets 96 is an opening 98 in the door 22. Extending through each of the openings 98 is a latch element 100 which is pivotally connected to its respective arm 94 by means of a pivot pin 102. It will be readily apparent that by rotating the shaft 88, the latch elements 100 may be withdrawn or projected as is necessary in the opening and closing of the door 22. The latch mechanism 84 is controlled by means of a single handle 104 which projects exteriorly of the door 22, as is best shown in Figures 1, 2 and 3. The handle 104 may also be used in the manipulation of the door 42 in the opening and closing thereof.

Although the preferred use of the door construction of this invention is in a vehicle construction, particularly automotive vehicles, at this time it is pointed out that it is not intended to so limit the invention. In the first place, the door construction may be used in all types of vehicles, including airplanes, boats, etc. Secondly, the door construction is not limited for use in vehicles, but may be used in buildings and the like.

The hinge units 30 may vary slightly in construction.

However, it is to be understood that irrespective of the construction of the hinge units, it is necessary that when the door is pulled outwardly from its original position, it will also move forwardly and upwardly. It is the hinge units which produce this result and therefore the hinge units must be constructed accordingly.

From the foregoing description of the door construction which is the subject of this invention, it will be readily apparent that there has been devised a highly desirable door construction which has a definite utility in the vehicle field and which door construction when properly mounted will permit the access to and the exit from a vehicle by a person while remaining in a comfortable upright position at all times. It will be further apparent that the door construction is of such nature whereby it may be readily adapted thereto without greatly changing the design of the vehicle.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A door assembly comprising a wall, an opening in said wall, a door normally seated in said opening and closing said opening, a hinge structure extending between said wall and said door and supporting said door, said hinge structure including a first pair of spaced hinges fixed to said wall and a second pair of spaced hinges connected to said door, spaced parallel arms connecting said first hinge pair to said second hinge pair, a track and guide connection between said hinges of said second pair and said door mounting said door on said second hinge pair for sliding movement generally parallel to said wall, said hinges being disposed at an angle to the vertical, cooperating latch means on said hinge structure and said door for locking said hinge structure in open positions in response to longitudinal movement of said door, said latch means including latch members on said hinge structure, and cam tracks on said door, each of said cam tracks aligned with one of said latch members and being engageable thereby.

2. A door assembly comprising a wall, an opening in said wall, a door normally seated in said opening and closing said opening, a hinge structure extending between said wall and said door and supporting said door, said hinge structure including hinge units for initially moving said door normal to said wall, a track and guide connection between said hinge units and said door mounting said door on said hinge units for sliding movement generally parallel to said wall, cooperating latch means on said hinge units and said door for locking said hinge units in open positions in response to longitudinal movement of said door, said latch means including a two piece link assembly on each of said hinge units, a cam track on said door for each of said link assemblies, said cam tracks being aligned with said link assemblies and engaging said link assemblies when said door is moved longitudinally from its original open position to prevent collapsing of said link assemblies.

3. In a vehicle of the type including a generally vertical side wall and a generally horizontal top, a door assembly comprising a door having a side forming portion and a top forming portion, said vehicle having a doorway in said side and said top, said door normally being sealed in said doorway and closing said doorway, a hinge structure extending between said side wall and said door and supporting said door, said hinge structure including hinge units for initially moving said door normally to said side wall and upwardly, outwardly and forwardly, a track and guide connection between said hinge units and said door mounting said door on said hinge units for sliding movement generally parallel to said wall, cooperating latch means on said hinge units and said door for locking said hinge units in open positions in response to longitudinal movement of said door, said latch means including a two piece link assembly on each of said hinge units, a cam track on said door for each of said link assemblies, said cam tracks being aligned with said link assemblies and engaging said link assemblies when said door is moved longitudinally from its original open position to prevent collapsing of said link assemblies.

4. A door assembly comprising a wall, an opening in said wall, a door normally seated in said opening and closing said opening, a hinge structure extending between said wall and said door and supporting said door, said hinge structure including a first pair of spaced hinges fixed to said wall and a second pair of spaced hinges connected to said door, spaced parallel arms connecting said first hinge pair to said second hinge pair, a track and guide connection between said hinges of said second pair and said door mounting said door on said second hinge pair for sliding movement generally parallel to said wall, said hinges being disposed at an angle to the vertical, cooperating latch means on said hinge structure and said door for locking said hinge structure in open position in response to longitudinal movement of said door, said latch means including a two-piece link assembly on said hinge structure, a cam track on said door for said link assembly, said cam track being continuously aligned with and in engagement with said link assembly, said latch means through engagement with said cam track preventing said door from sliding while said hinge structure is collapsed in a closed position and preventing said hinge structure from collapsing when said door is moving longitudinally from its open position.

References Cited in the file of this patent

UNITED STATES PATENTS

| | | |
|---|---|---|
| 423,739 | Cook | Mar. 18, 1890 |
| 721,327 | Rickel | Feb. 24, 1903 |
| 1,961,205 | De Vizcaya | June 5, 1934 |

FOREIGN PATENTS

| | | |
|---|---|---|
| 483,612 | Canada | May 27, 1952 |
| 698,436 | France | Nov. 18, 1930 |
| 1,029,605 | France | Mar. 11, 1953 |
| 389,061 | Great Britain | of 1933 |
| 19,936 | Great Britain | 1906 |